United States Patent [19]

Cabalfin

[11] Patent Number: 5,226,454

[45] Date of Patent: Jul. 13, 1993

[54] DC MOTOR ACTUATED FLOW DIVERSION VALVE

[75] Inventor: Roland V. Cabalfin, Anaheim, Calif.

[73] Assignee: Hydrotech Chemical Corporation, City of Industry, Calif.

[21] Appl. No.: 886,712

[22] Filed: May 21, 1992

[51] Int. Cl.$^5$ .............................................. F16K 31/04
[52] U.S. Cl. ................................ 137/870; 251/129.01; 251/129.12
[58] Field of Search ............... 137/870, 876; 251/129.01, 129.11, 129.12

[56] References Cited

U.S. PATENT DOCUMENTS

| | | | |
|---|---|---|---|
| 3,080,952 | 3/1963 | Carlstedt | 192/0.02 |
| 4,169,491 | 10/1979 | Bajka | 137/876 X |
| 4,398,562 | 8/1983 | Saarem | 251/129.12 X |
| 4,580,761 | 4/1986 | Silcox et al. | 251/129.11 |
| 4,647,007 | 3/1987 | Bajka | 251/129.12 X |
| 4,741,508 | 5/1988 | Fukamachi | 251/129.12 X |
| 4,852,071 | 7/1989 | Otto | 251/129.12 X |
| 4,892,286 | 1/1990 | Reinicke et al. | 251/129.11 |
| 4,930,746 | 6/1990 | Reinicke et al. | 251/129.11 |
| 5,024,418 | 6/1991 | Reinicke et al. | 251/129.11 |

*Primary Examiner*—John C. Fox
*Attorney, Agent, or Firm*—Woodard, Emhardt, Naughton, Moriarty & McNett

[57] ABSTRACT

A motor actuated electric valve includes a DC motor, a gear reducer assembly, a valve body and a fluid diverter mechanically attached to the output of the gear reducer assembly. Rotation of the motor results in repositioning of the diverter within the valve body. Unidirectional and bidirectional operation of the motor are achieved via a rectifier circuit and cams which actuate limit switches to interrupt operation of the motor when the diverter is in a first or a second desired position. The valve is readily substituted for current AC actuated valves since the rectifier is incorporated into the valve actuator.

16 Claims, 5 Drawing Sheets

DC MOTOR ACTUATED FLOW DIVERSION VALVE

FIELD OF THE INVENTION

This invention relates to flow diversion valves and more specifically to valves incorporating electric actuators for repositioning the diverter within the flow diversion valve.

BACKGROUND OF THE INVENTION

Several electrical valve actuators are presently available in the marketplace. In most pool and spa applications, it is desirable to have a highly efficient and powerful valve actuator. Actuators presently available on the market use a low voltage inductive motor or a stepper motor to drive the actuator. The low voltage AC inductive motor is very inefficient, low in torque, and very heavy. In many cases, the seal of the valve diverter will swell after a period of use. When seal swelling occurs, the AC inductive motor will stall, and the result will be a high power drain, and a burned motor or potential damage to the circuits supplying power to the motor.

A stepper motor for use as an actuator of a diversion valve is an improvement over the AC inductive motor. The stepper motor has a permanent magnet rotor that reacts to the reversing magnetic induction from the stator. The stepper motor, as the name implies, produces incremental angular rotation in accordance with the number of poles on the stator and the energization sequence of the stator windings. The number of poles corresponds with the angle of movement per step. In the swimming pool and spa industry, the stepper motor typically used is a low speed motor, which reacts to the 60 cycles of the AC line power supply. Timing, speed, and direction of travel is generally dictated by a capacitor. The frequency of the AC power supply also limits the speed of the motor to 360 rpm or 1 revolution per every 10 input signal cycles or wavelengths. The stepper motor typically drives a set of gears to reduce the speed and increase the torque capability of the actuator. A 360 to 1 gear ratio will give the actuator enough torque to rotate the valve diverter 180° in 30 seconds. The stepper motor is a better alternative to the AC inductive motor. This is indicated in view of the industry movement towards use of the stepper motor and phasing out use of the AC motor.

Even though the stepper motor has a good acceptance in the swimming pool industry, it is not an efficient motor. Power comsumption is 700 milliamps compared to 180 milliamps of a DC motor. Similar to the AC inductive motor, the stepper motor is also susceptible to a stalled situation if the diverter seal swells thereby increasing the force required to rotate the diverter within the valve body.

The cost to produce both the AC inductive motor, and the stepper motor is considerably high. The cost is primarily related to the amount and cost of materials involved, specialized construction, and production volume. A DC motor, on the other hand, is a very inexpensive motor, particularly because many are used in numerous applications, specifically battery powered applications. Manufacturers produce DC motors by the millions every day. Many of the manufactures in several countries are intense in competing for customers in the DC motor market. Another advantage of a DC motor over an AC motor is its ability to reverse the direction of rotation without the need for additional rotor windings.

A DC motor actuated flow diversion valve which consumes less power, produces a higher torque level for moving a diverter within a valve, and is readily substituted for present AC motor driven valves is needed.

SUMMARY OF THE INVENTION

A motor actuated electric valve according to one aspect of the present invention includes a valve body having an inlet port, a first outlet port, a second outlet port and an aperture. A fluid diverter is situated within the aperture of the valve body and provides fluid communication only between the inlet port and the first outlet port when the diverter is rotated to a first position, the diverter providing fluid communication only between the inlet port and the second outlet port when the diverter is rotated to a second position. The diverter also includes means for engaging a rotating member. The valve further includes means for increasing shaft torque versus a corresponding decrease in rotational speed, the means for increasing including an input shaft and an output shaft coupled to the means for engaging a rotating member of the diverter. A DC motor having an output shaft is mechanically coupled to the input shaft of the means for increasing shaft torque, and an AC to DC power source means for converting an AC excitation signal into a DC power signal supplies the DC power signal to the DC motor.

One object of the present invention is to provide an improved motor actuated fluid flow diversion valve.

Another object of the present invention is to provide a flow diversion valve which is more efficient in its use of electrical energy.

A further object of the present invention is to provide a flow diversion valve wherein the motor actuator produces a higher torque output in accordance with a lower electrical power input signal.

Yet another object of the present invention is to provide a flow diversion valve which may be substituted for current AC excited valves and yet includes a DC motor.

Still another object of the present invention is to provide a motor actuated diversion valve for use in pool and spa applications which includes a reversible motor requiring minimal cost and control electronics to minimize the cost of the actuator and valve assembly.

These and other objects of the present invention will become more apparent from the following description of the preferred embodiment.

DESCRIPTION OF THE PREFERRED EMBODIMENT

Figure 1:
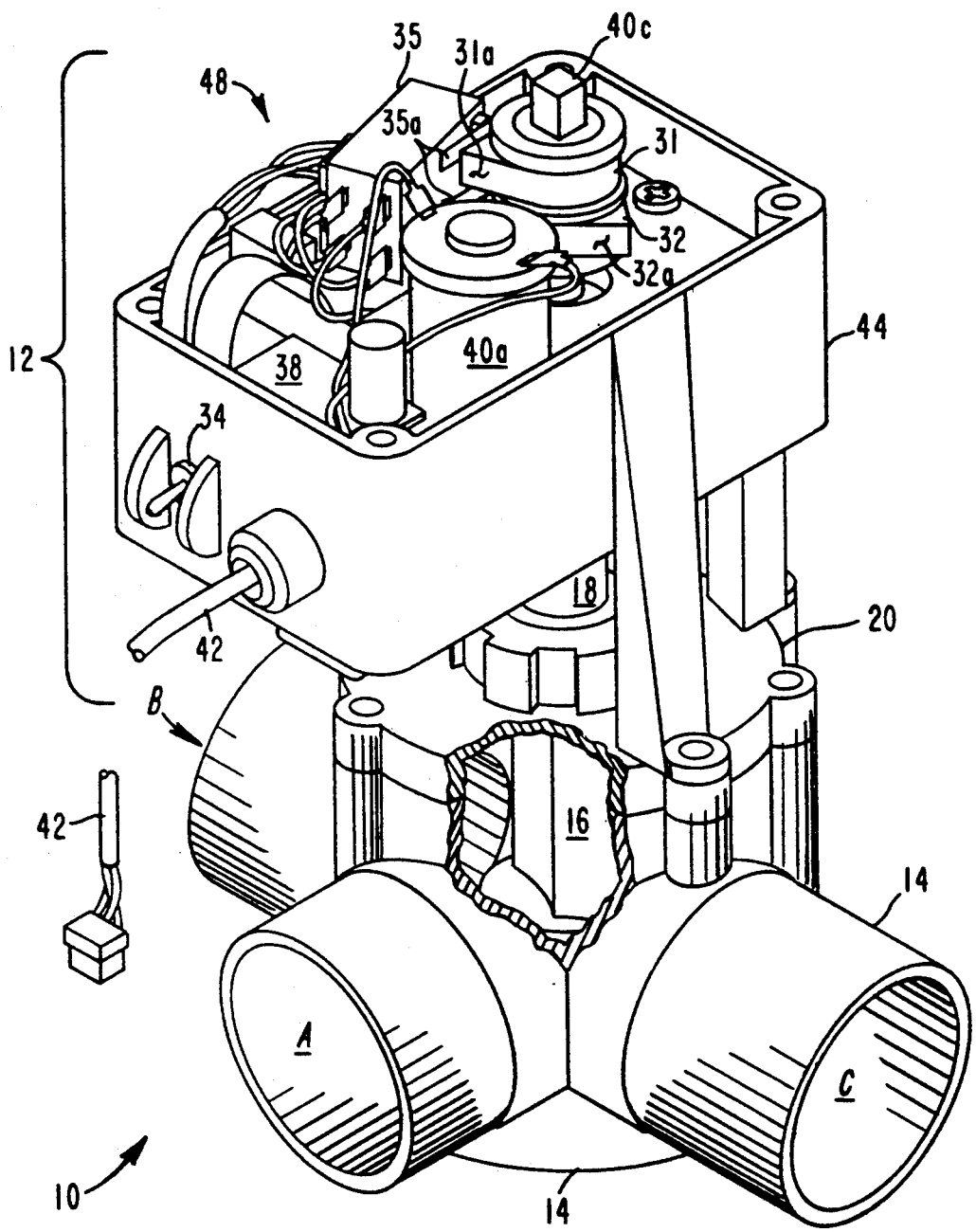
FIG. 1 is a partial cutaway perspective view of one embodiment of a motor actuated electric valve according to the present invention with the housing cover removed.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1A:
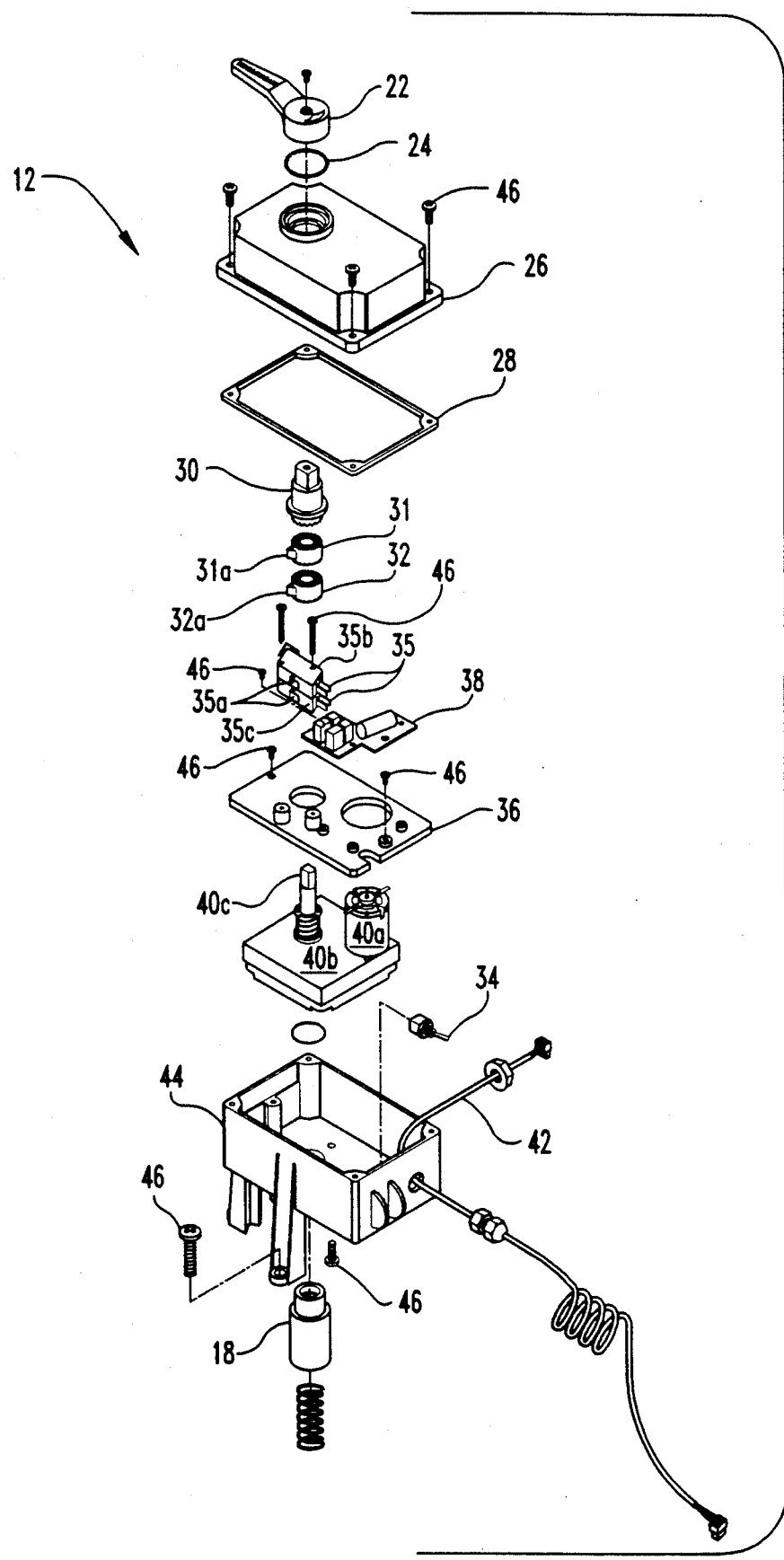
FIG. 1A is an exploded view of the valve actuator shown in FIG. 1.

Referring now to FIGS. 1 and 1A, a motor actuated valve 10 according to the present invention is shown. The valve 10 includes actuator 12 and valve body 14. Actuator 12 is shown in complete form in FIG. 1A in exploded view fashion. A diverter 16 situated within valve body 14 and diverts fluid flow from the inlet fluid port A to outlet fluid ports B or C in accordance with the rotational position of diverter 16. Shaft 18 provides a mechanical coupling between actuator 12 and diverter 16. Rotation of shaft 18 rotates diverter 16 in a corresponding fashion. Cover 20 is mechanically attached to valve body 14 and provides a fluid tight seal between shaft 18 and valve body 14 as well as positioning shaft 18 with respect to valve body 14. Standard O-ring seals well known in the art provide a water seal between shaft 18 and cover 20.

The actuator 12, shown in more detail in exploded view form in FIG. 1A, includes the following component parts: handle 22, O-ring gasket 24, housing cover 26, gasket 28, handle shaft adapter 30, cams 31 and 32, toggle switch 34, plate 36, circuit board assembly 38, motor gear assembly 40 including a motor 40a and a gear reducer assembly 40b, wire harness 42 and actuator housing 44. Handle 22 and cover 26 are not shown in FIG. 1 so that the internal components of actuator 12 are visible. Screws 46 provide mechanical fastening mechanisms for attaching various components of the actuator to one another. Limit switch assembly 35 includes two microswitches or limit switches which are actuated in accordance with the rotation of cams 31 and 32.

Operationally speaking, motor 40a is mechanically coupled to gear reduction assembly 40b so that rotation of the motor output shaft (not shown) of motor 40a results in rotation of gear reducer assembly output shaft 40c. Shaft 40c rotates at a speed much slower than that of the motor 40a as a result of a gear reduction within assembly 40b. Thus, gear reducer assembly 40b is a means for increasing torque in accordance with a reduction in speed of the output shaft 40c versus the rotational speed of the motor output shaft. The motor output shaft drives the input shaft of the gear reducer assembly 40b. As shaft 40c rotates, cams 31 and 32, handle shaft adapter 30, handle 22, and shaft 18 rotate in unison therewith. Lobes 31a and 32a mechanically actuate the actuator arms 35a of limit switches 35b and 35c, respectively. Rotation of shaft 18 results in repositioning of diverter 16 within valve body 14 so that fluid flow from inlet fluid port A is diverted to either port C or port B. Various wiring and cabling shown in FIG. 1 and indicated at 48 establishes an interconnection among the components of circuit board 38, limit switch assembly 35, motor 40a and switch 34.

Figure 2:
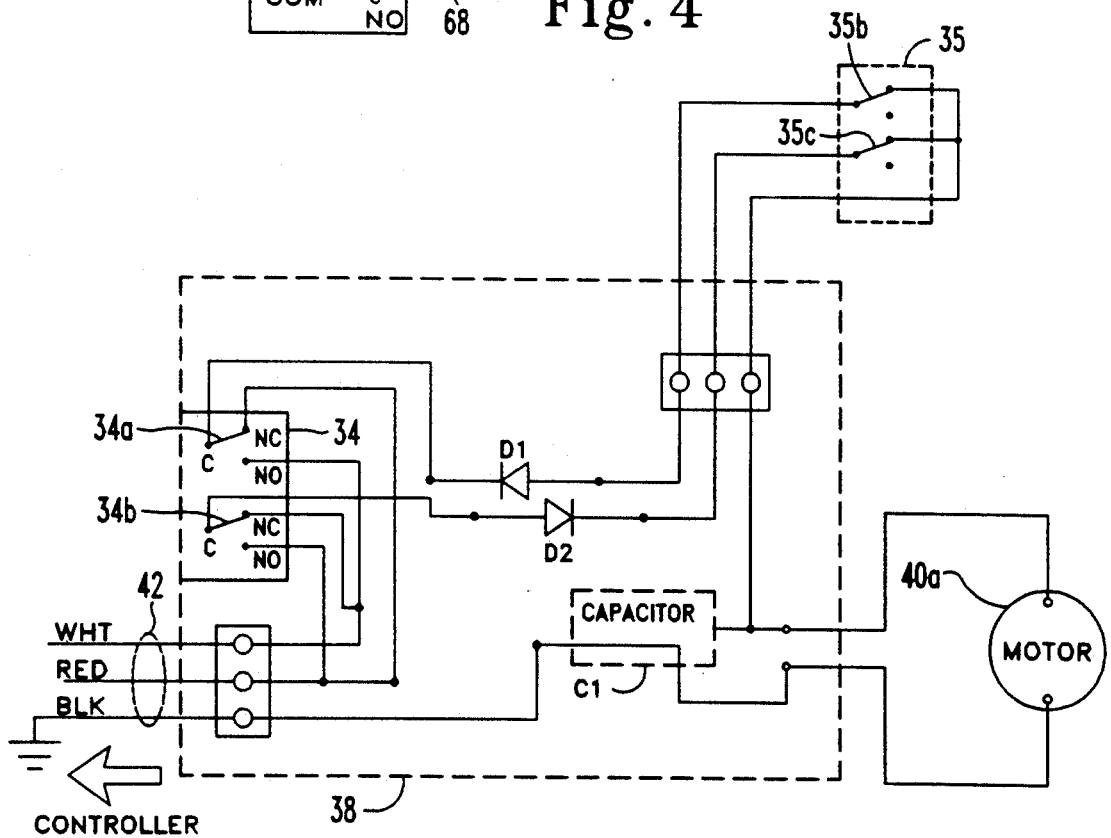
FIG. 2 is an electrical schematic of the valve actuator in FIG. 1.

Referring now to FIG. 2, an electrical schematic for the motor actuator 12 according to the present invention is shown. Wire harness 42 includes 3 conductors labeled WHT for white, RED for red and BLK for black. The BLK lead is common. The RED power lead is connected to an AC signal when the diverter is desired in a first position, and the white lead labeled WHT is connected to an AC signal when the diverter is desired in a second position, typically 180° away from the first position. Preferably between 12 and 24 volts AC is supplied on the RED or WHT lead to energize the motor. The motor 40a is connected in parallel with capacitor C1. Limit switch assembly 35, double-pole double-throw switch 34 and diodes D1 and D2 comprise the elements of the circuit. Circuit board 38 is indicated by a broken line. Diodes D1 and D2 rectify the AC signal supplied through wire harness 42. The rectified AC signal is supplied to motor 40a and smoothed or filtered via capacitor C1 which acts as a high-pass filter. Switch 34 enables manual reversal of the motor and repositioning of the diverter in opposition to the AC power signal appearing on the WHT or RED lead, i.e. the controller signals are swapped on the RED and WHT leads by switch 34. With AC power connected to the RED lead, AC power is supplied to motor 40a through switch contact set 34a and diode D1 so that a half-wave negative rectified and filtered signal appears across the leads of motor 40a. The negative polarity signal is supplied to motor 40a until cam lobe 31a opens switch contact 35b thereby opening the signal path from the RED conductor of cable or harness 42 through switch 34 and diode D1 to motor 40a. When switch 34 is positioned in the normally open position, the RED lead signal is coupled through switch 34b and diode D2. Thereafter, a positive polarity half-wave rectified and filtered signal appears across the motor 40a. Likewise, supplying AC power to the WHT lead results in a positive polarity voltage across motor 40a with switch 34 in the normally closed position and the RED lead disconnected from any signal source. (Toggling switch 34 reverses the voltage polarity across the motor with power supplied to the WHT lead). The positive polarity signal appears across the leads of motor 40a until switch contact 35c is activated to open in accordance with cam lobe 32a actuating arm 35a of limit switch 35c. In summary, a positive or a negative polarity DC voltage is supplied to motor 40A via the control circuitry shown in FIG. 2. Thus, a bi-directional or reversible DC motor control circuit is provided in the embodiment of FIGS. 1 and 2.

Figure 3:
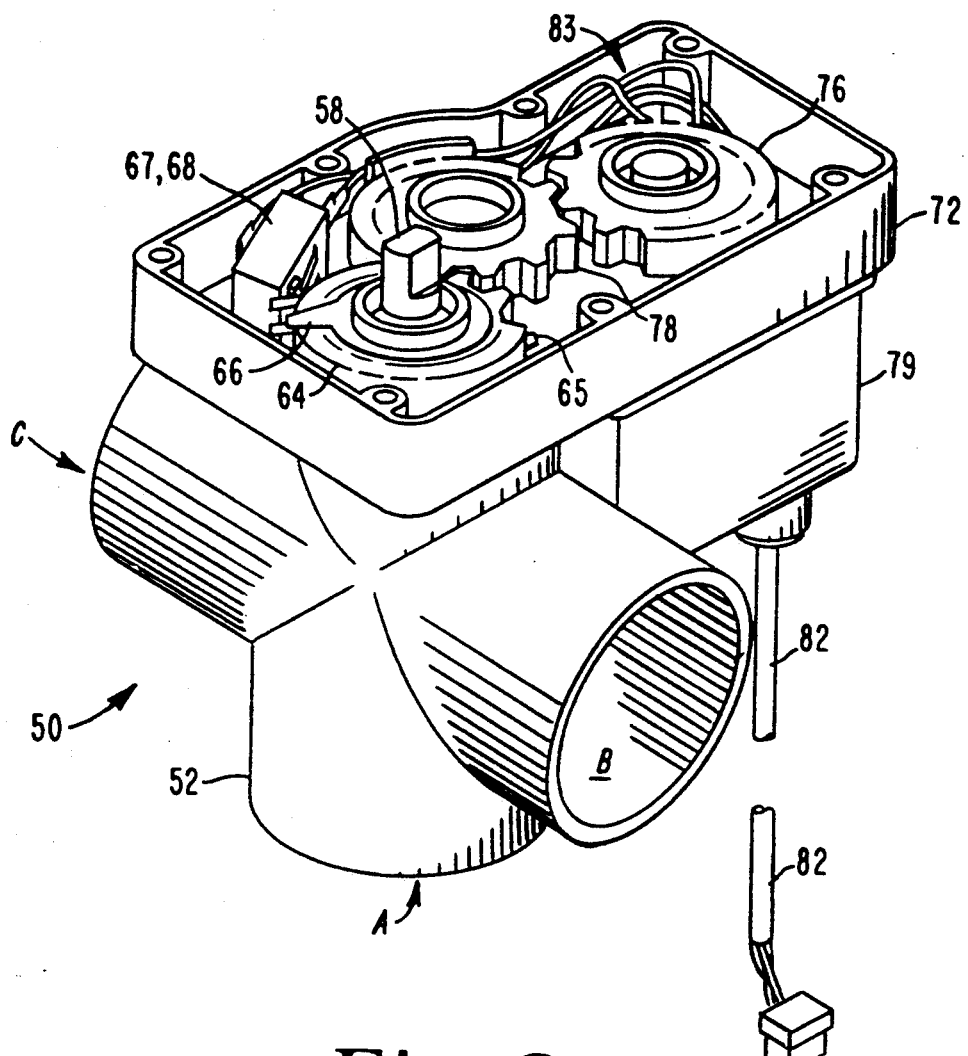
FIG. 3 is a perspective view of a motor actuated electric valve according to another aspect of the present invention with the actuator housing cover removed.
Figure 3A:
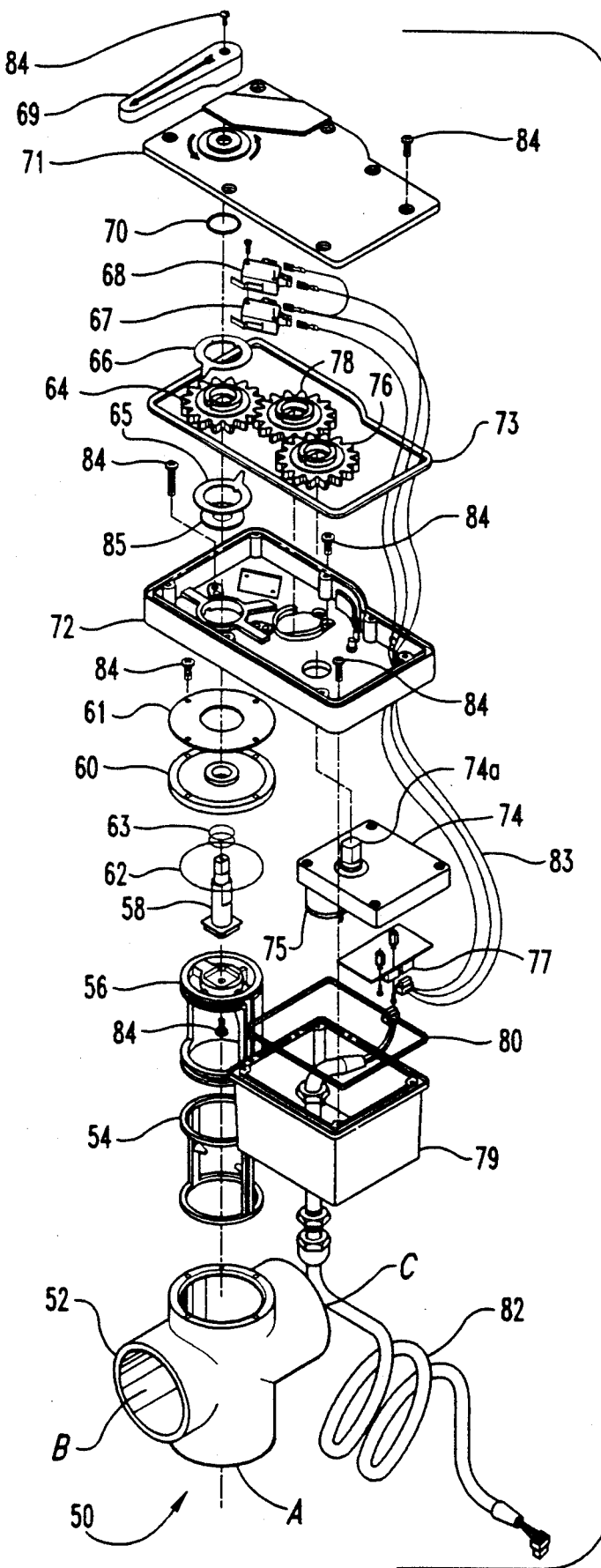
FIG. 3A is an exploded perspective view of the valve shown in FIG. 3.

Referring now to FIGS. 3 and 3A, another embodiment of a motor actuated electric valve 50 according to the present invention is shown. Valve 50 includes a valve body 52, a diverter seal 54, a diverter 56, a diverter shaft 58, cover 60, gasket 61 and O-ring seals 62 and 63. Shaft 58 is rotated in accordance with rotation of gear 64. Cams 65 and 66 have lobes in 180° out of phase position. The lobes of cams 65 and 66 actuate limit switches 67 and 68, respectively. Handle 69 is attached to shaft 58 and rotates in accordance therewith. O-ring seal 70 provides a water tight seal between top cover 71 and gear 64. Gasket 72 provides a seal between top cover 71 and gear box housing 72. Top cover 71 and handle 69 are removed in FIG. 3 so that the internal components and structure within housing 72 are visible. Gear reduction assembly 74, with DC motor 75 attached thereto, is disposed adjacent and mechanically attached to housing 72. Circuit board assembly 77 is disposed within housing 79 which also encloses motor 75 and assembly 74 therein. Gasket 80 provides a water tight seal between housing 79 and housing 72. The output shaft 74a of assembly 74 drives gear 76. Gear 78 provides a rotational power transmission linkage between gear 76 and gear 64. Gear 78 is mechanically restrained in position by circular hubs or protrusions (not shown) molded into top cover 71 and housing 72 that hold gear 78 captively in place and allow gear 78 to rotate about its axis of rotation. Gear 64 is fixedly attached to shaft 58. Shaft 58 engages diverter 56 and imparts rotary motion to diverter 56 within valve body 52. Valve body 52 diverts fluid flow from port A to port B or to port C depending upon the position of diverter 56. Power is supplied to the motor actuated electronic valve 50 via cable or wire harness 82. Wires 83 provide an electrical connection between circuit board 77 and switches 68 and 67. Washer 85 is positioned between cam 65 and housing 72. Screws 84 mechanically attach various adjacent components to one another in the valve 50.

Operationally speaking, rotation of the output shaft of motor 75 results in a much slower rotation of output shaft 74a of gear reducer assembly 74. As shaft 74a rotates, gear 76 rotates. Gear reducer assembly 74 is a means for increasing torque in accordance with a reduction in speed of the output shaft 74a versus the rotational speed of the motor output shaft. The motor output shaft drives the input shaft of gear reducer assembly 74. In conjunction therewith, gears 78 and 64 also rotate in accordance with gear 76. As gear 64 rotates, shaft 58 is rotated and thus diverter 56 is rotated within valve body 52. Additionally, cams 66 and 65 (which both include a cam lobe) actuate switches 67 or 68 so that the diverter is positioned in a first or a second desired position. The desired positions for diverter 56 provide fluid flow between ports A and B or establish fluid flow between fluid ports A and C. Handle 69 is rotated in accordance with shaft 58 so that handle 69 provides a visual indicator of the position of diverter 56 to indicate the direction of fluid flow within the valve body 52.

Figure 4:
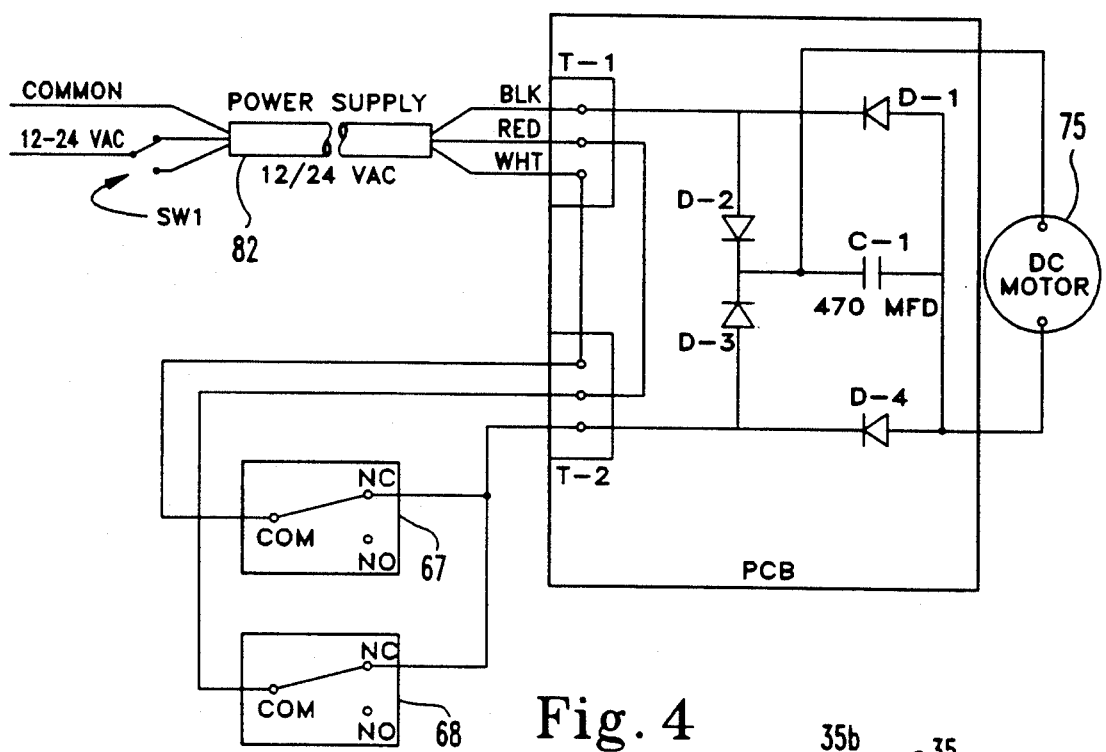
FIG. 4 is an electrical schematic of the valve actuator in FIG. 3.

Referring now to FIG. 4, a schematic diagram for the actuator of valve 50 is shown. The circuit includes diodes D1, D2, D3 and D4 which form a full wave bridge rectifier. Capacitor C1 is connected in parallel across the output of the full wave rectifier to provide a low pass filter at the output of the rectifier. DC motor 75 is connected in parallel with capacitor C1. Switches 67 and 68 provide switched power to one input (diode D3 and diode D4 node) of the full wave rectifier. Switch SW1 is actuated by the user when it is desired to move the diverter within valve body 50 to an alternate position determined by cams 65 and 66. In this embodiment, DC motor 75 is supplied with a full wave rectified and filtered AC signal and the output shaft of DC motor 75 rotates in a unidirectional fashion. However, the operation of motor 75 is interrupted at a first and a second position in accordance with the positions of cams 66 and 65. For example, it is desired that cam 66 actuate switch 68 when the diverter 56 is positioned so that fluid ports A and B are in fluid communication. Likewise, when cam 65 actuates switch 67, it is desired that diverter 56 be in position to establish fluid communication between port A and port C within valve body 52. Such operation is accomplished through the circuit of FIG. 4 and the additional external switch SW1 (which operates as a simplified form of a controller). The lead labelled BLK of cable 82 is connected to "AC COMMON" or an AC neutral signal. When switch SW1 is in the position shown (#1), power (between 12 and 24 volts AC supplied through the lead labeled RED) is applied to DC motor 75 via the circuitry shown until cam 66 actuates and opens the NC contacts of switch 68. Thereafter, current flow through motor 75 is interrupted and motor 75 terminates rotation. When switch SW1 is actuated into its second position (#2) wherein the 12-24 VAC signal is supplied to the WHT lead of cable 82, then current flows through switch 67 to the diode bridge circuit until switch 67 is opened in accordance with the repositioning of cam 65 and actuation of limit switch 67 opening the contacts of switch 67 labeled NC. The circuit of FIG. 4 provides a single polarity DC signal to the motor 75 so that unidirectional operation of the valve diverter is achieved.

Materials preferably used in constructing the motor actuated valves 10 and 50 include plastics or polymers (such as NORYL manufactured by Du Pont) for gears, cams, diverters, housings and covers, urethane for gaskets, CPVC for the valve bodies, and copper-clod fiberglass for the circuit boards. Support plate 36 is constructed of plastic 0.200 thick for increased strength. Cams 65 and 66 are metal stampings. Shaft 58 is machined yellow brass. DC motors 40a and 75 are 12-24 volt DC motors available from Barber Coleman and other known companies. Gear reducer assemblies 40 and 74 are 3000:1 reduction drive units.

It should be recognized that only a single cam is required to activate the limit switches if the switches are positioned on opposite sides of the cam axis.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A motor actuated electric valve comprising:
   a valve body having an inlet port, a first outlet port, a second outlet port, said valve body defining a passageway communicating between the inlet port and the first and second outlet ports and an aperture in fluid communication with the passageway;
   a fluid diverter situated within said aperture of said valve body and providing fluid communication only between said inlet port and said first outlet port when said diverter is rotated to a first position, said diverter providing fluid communication only between said inlet port and said second outlet port when said diverter is rotated to a second position;
   a DC motor having a motor shaft;
   means for increasing torque, said means for increasing torque including an input shaft coupled to the shaft and an output shaft, said means for increasing torque producing increased torque at said output shaft in exchange for a corresponding decrease in rotational speed of said output shaft versus said input shaft;
   engaging means for coupling said diverter to the output shaft; and
   AC to DC power source means for converting an AC excitation signal into a DC power signal and supplying said DC power signal to said DC motor.

2. The valve of claim 1 wherein said AC to DC power source means includes means for rectifying having a first input and a second input, said means for rectifying producing a positive DC power signal at a first output when said AC excitation signal is supplied to said first input and a negative DC power signal at a second output when said AC excitation signal is supplied to said second input, and wherein said DC motor is connected between said first output and said second output; and switch means for supplying said AC excitation signal to said first input when said switch means is activated, and for supplying said AC excitation signal to said second input when said switch means is deactivated.

3. The valve of claim 2 further including first limit switch means having normally closed contacts and connected in series between said DC motor and said first output of said means for rectifying, said first limit switch means opening said circuit when actuated;

second limit switch means having normally closed contacts and connected in series between said DC motor and said second output, said second limit switch opening when actuated; and wherein said output shaft includes a first cam lobe and a second cam lobe, said first cam lobe actuating said first limit switch to open when said diverter is in said first position and said second cam lobe actuating said second limit switch to open when said diverter is in said second position.

4. The valve of claim 3 including a high pass filter connected in parallel with said DC motor and wherein said means for increasing torque is a speed reducing gear box.

5. The valve of claim 1 including:

first limit switch means having normally closed contacts and connected in series between said AC excitation signal and said AC to DC power source means, said first limit switch means opening said circuit when actuated;

second limit switch means having normally closed contacts and connected in series between said AC excitation signal and said AC to DC power source means, said second limit switch opening when actuated;

wherein said AC to DC power source means includes means for rectifying, said means for rectifying producing said DC power signal when said AC excitation signal is supplied to said AC to DC power source means; and wherein said output shaft includes a first cam lobe and a second cam lobe, said first cam lobe actuating said first limit switch to open when said diverter is in said first position and said second cam lobe actuating said second limit switch to open when said diverter is in said second position.

6. The valve of claim 5 including a high pass filter connected in parallel with said DC motor and wherein said means for increasing torque is a speed reduction gear box.

7. The valve of claim 6 wherein said rectifying means is a full wave bridge rectifier circuit.

8. An electric valve comprising:

a valve body having an inlet port, a first outlet port, a second outlet port and an aperture;

means for diverting fluid situated within said aperture of said valve body and enabling fluid communication only between said inlet port and said first outlet port when said means for diverting is rotated to a first position, said means for diverting enabling fluid communication only between said inlet port and said second outlet port when said means for diverting is rotated to a second position;

a DC motor having a motor shaft and electrical leads for connecting said motor to a source of power; and means for increasing torque, said means for increasing torque including an input shaft coupled to said motor shaft and an output shaft coupled to said means for diverting fluid, said means for increasing torque producing increased torque at said output shaft in exchange for a corresponding decrease in rotational speed of said output shaft versus said input shaft, and wherein rotation of said output shaft moves said means for diverting into said first position or said second position;

power source means for supplying a DC power signal to said electrical leads of said DC motor, said power source means including circuit means for interrupting the supply of said DC power signal to said motor as said means for diverting moves into said first or said second position.

9. The valve of claim 8 wherein said power source means includes means for rectifying having a first input and a second input, said means for rectifying producing a positive DC power signal at a first output when an AC excitation signal is supplied to said first input and a negative DC power signal at a second output when said AC excitation signal is supplied to said second input, and wherein said leads of said DC motor are connected across said first output and said second output.

10. The valve of claim 8 wherein said power source means includes a power input and wherein an AC power signal is supplied to said power input, and wherein said circuit means includes a first limit switch and a second limit switch, said means for diverting including a cam means rotating in synchronism with said means for diverting, said cam means actuating said first limit switch to interrupt power supplied to said motor as said means for diverting moves into said first position, said cam means actuating said second limit switch and interrupting power supplied to said motor as said means for diverting moves into said second position.

11. The valve of claim 10 wherein said power source means includes a rectifier to rectify said AC power signal and produce a rectified AC signal and a low pass filter to smooth said rectified AC signal and produce said DC power signal.

12. The valve of claim 11 wherein said cam means includes a first cam for actuating said first limit switch, said cam means also including a second cam and wherein said first cam actuates said first limit switch as said means for diverting moves into said first position and said second cam actuates said second limit switch as said means for diverting moves into said second position.

13. The valve of claim 12 wherein said means for diverting is a diverter situated within said aperture of said valve body and said means for increasing torque is a gear reduction assembly.

14. The valve of claim 13 wherein said gear reduction assembly has at least a 500:1 gear reduction.

15. The valve of claim 14 wherein said power source means includes polarity reversing means for supplying said DC power signal to said DC motor to move said diverter from said first position to said second position, said polarity reversing means reversing the polarity of said DC power signal supplied to said DC motor in response to receiving a control signal to move said diverter from said second position to said first position.

16. The valve of claim 14 wherein said power source means includes a rectifier circuit having an input for receiving an AC input signal and an output, and a capacitor connected in parallel with said output said rectifier to filter said DC power signal.

* * * * *

UNITED STATES PATENT AND TRADEMARK OFFICE
CERTIFICATE OF CORRECTION

PATENT NO. : 5,226,454
DATED : July 13, 1993
INVENTOR(S) : Roland V. Cabalfin

It is certified that error appears in the above-identified patent and that said Letters Patent is hereby corrected as shown below:

In column 10, at line 6, insert --of-- after "output".

Signed and Sealed this

Fifteenth Day of March, 1994

Attest:

BRUCE LEHMAN

*Attesting Officer*  *Commissioner of Patents and Trademarks*